(12) United States Patent
Pickard et al.

(10) Patent No.: US 9,640,959 B2
(45) Date of Patent: May 2, 2017

(54) PLATFORM WITH ENGINE AND WIRING HARNESS SYSTEM, PLATFORM WITH CONTROLLED SYSTEM AND WIRING HARNESS SYSTEM, AND WIRING HARNESS SYSTEM

(71) Applicant: Rolls-Royce North American Technologies, Inc., Indianapolis, IN (US)

(72) Inventors: Andrew Charles Pickard, Indianapolis, IN (US); Philip Martin Green, Indianapolis, IN (US); Kimberly Nicole Merrill, Waterford, MI (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 68 days.

(21) Appl. No.: 14/319,422

(22) Filed: Jun. 30, 2014

(65) Prior Publication Data

US 2014/0313689 A1 Oct. 23, 2014

Related U.S. Application Data

(63) Continuation of application No. PCT/US2012/072130, filed on Dec. 28, 2012.
(Continued)

(51) Int. Cl.
*H05K 9/00* (2006.01)
*H02G 3/06* (2006.01)
(Continued)

(52) U.S. Cl.
CPC ............ *H02G 3/06* (2013.01); *H01R 13/658* (2013.01); *H01R 13/6666* (2013.01);
(Continued)

(58) Field of Classification Search
CPC ............ H01R 13/658; H01R 13/6666; H01R 13/6315; H01R 13/6592; H01R 13/6598;
(Continued)

(56) References Cited

U.S. PATENT DOCUMENTS 2,403,468 A * 7/1946 Swart .................. H01R 13/625
178/45
3,992,652 A 11/1976 Blaisdell
(Continued)

OTHER PUBLICATIONS

Extended European Search Report, EP12869038, Rolls Royce Corporation, Jul. 7, 2015.
(Continued)

*Primary Examiner* — James Wu
(74) *Attorney, Agent, or Firm* — Barnes & Thornburg, LLP

(57) ABSTRACT

One embodiment of the present invention is a unique platform. Another embodiment is a unique engine system. Another embodiment is a unique wiring harness system. Other embodiments include apparatuses, systems, devices, hardware, methods, and combinations for one or more of various types of platforms, such as aircraft, ground vehicles, water-borne vessels and stationary platforms; engine systems; and wiring harness systems. Further embodiments, forms, features, aspects, benefits, and advantages of the present application will become apparent from the description and figures provided herewith.

10 Claims, 2 Drawing Sheets

Related U.S. Application Data

(60) Provisional application No. 61/581,517, filed on Dec. 29, 2011.

(51) Int. Cl.
 *H01R 13/719* (2011.01)
 *H01R 13/66* (2006.01)
 *H01R 13/658* (2011.01)

(52) U.S. Cl.
 CPC ....... *H01R 13/719* (2013.01); *B64D 2221/00* (2013.01); *F02D 2400/22* (2013.01)

(58) Field of Classification Search
 CPC .............. H01R 13/719; B60R 16/0207; B64D 2221/00; B64D 45/02; H01B 11/1033; H02G 3/06; F02D 2400/22
 USPC .......................... 361/818; 174/72 A; 307/9.1
 See application file for complete search history.

(56) References Cited

U.S. PATENT DOCUMENTS

| | | | |
|---|---|---|---|
| 5,127,601 A | | 7/1992 | Schroeder |
| 5,190,479 A | * | 3/1993 | Jordi ................... H01R 13/7195 333/185 |
| 5,206,779 A | | 4/1993 | Sato et al. |
| 5,504,274 A | * | 4/1996 | McCabe ............ H01B 11/1033 156/50 |
| 5,508,876 A | | 4/1996 | Vaubois et al. |
| 5,817,980 A | | 10/1998 | Kirma |
| 6,343,954 B1 | | 2/2002 | Facciano et al. |
| 7,339,119 B2 | | 3/2008 | Hamazu et al. |
| 7,572,147 B1 | | 8/2009 | Wierzbicki |
| 2002/0067077 A1 | * | 6/2002 | Hentschel ........... B60R 16/0207 307/10.1 |
| 2007/0270037 A1 | | 11/2007 | Deterre et al. |
| 2008/0078879 A1 | | 4/2008 | Weaver |
| 2009/0084600 A1 | | 4/2009 | Severance |

OTHER PUBLICATIONS

International Search Report and Written Opinion, PCT/US2012/072130, Aug. 22, 2013.

Extended European Search Report, European Application 12869038.5-1801, Feb. 7, 2017, 7 pages.

\* cited by examiner

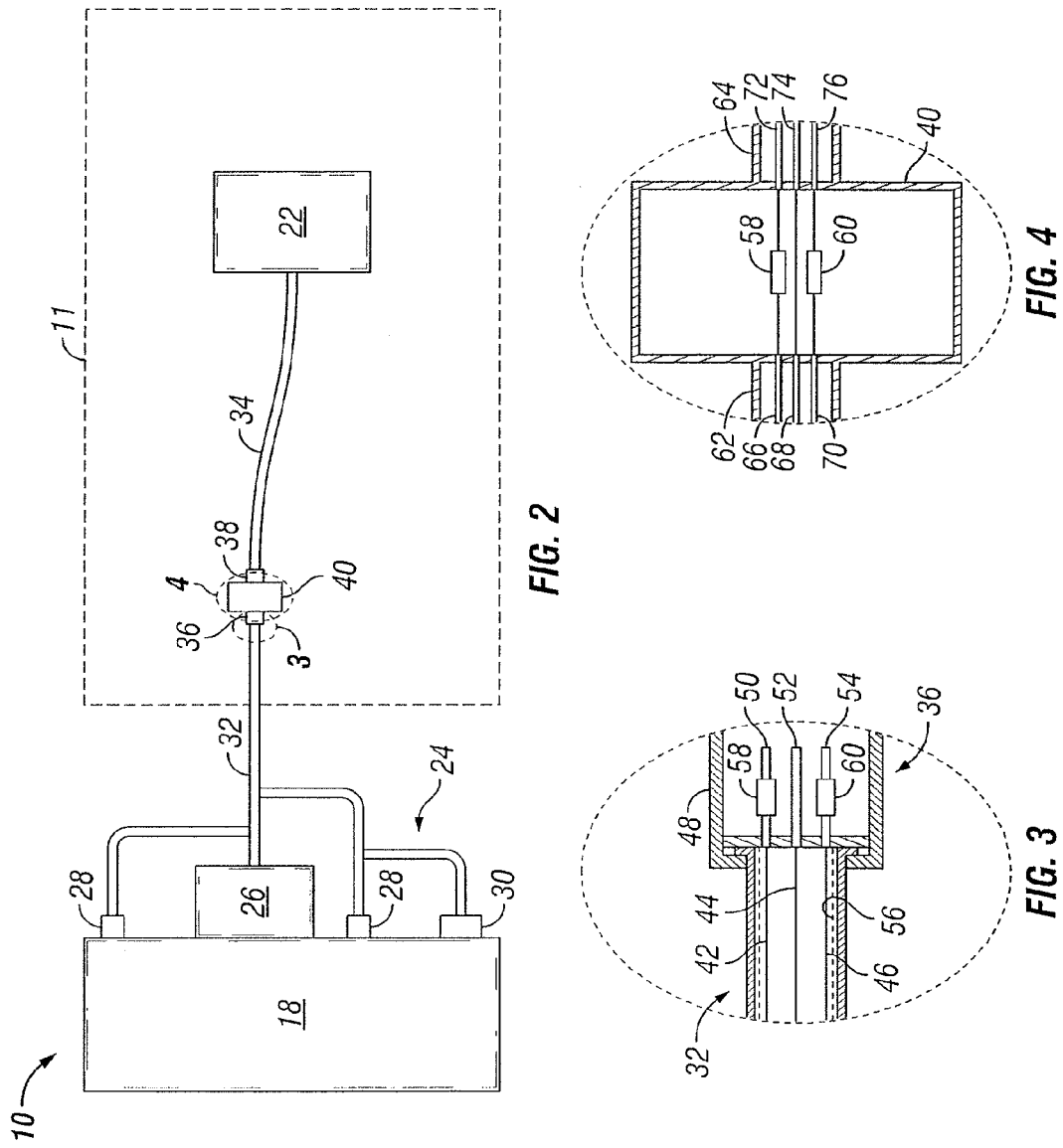

PLATFORM WITH ENGINE AND WIRING HARNESS SYSTEM, PLATFORM WITH CONTROLLED SYSTEM AND WIRING HARNESS SYSTEM, AND WIRING HARNESS SYSTEM

CROSS REFERENCE TO RELATED APPLICATIONS

The present application is a continuation of PCT Application No. PCT/US2012/072130, filed Dec. 28, 2012, which claims the benefit of U.S. Provisional Patent Application No. 61/581,517 filed Dec. 29, 2011, each of which is incorporated herein by reference.

GOVERNMENT RIGHTS

The present application was made with the United States government support under Contract No. N00019-03-C-0057, awarded by the United States Navy. The United States government may have certain rights in the present application.

FIELD OF THE INVENTION

The present invention relates to engine powered machines, and more particularly, to platforms of various types having wiring harnesses.

BACKGROUND

Platforms, such as aircraft, ships, vehicles and stationary platforms; engines for platforms; and wiring harness systems that effectively protect against electromagnetic interferences remain an area of interest. Some existing systems have various shortcomings, drawbacks, and disadvantages relative to certain applications. Accordingly, there remains a need for further contributions in this area of technology.

SUMMARY

One embodiment of the present invention is a unique platform. Another embodiment is a unique engine system. Another embodiment is a unique wiring harness system. Other embodiments include apparatuses, systems, devices, hardware, methods, and combinations for one or more of various types of platforms, such as aircraft, ground vehicles, water-borne vessels and stationary platforms; engine systems; and wiring harness systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 2 schematically illustrates some aspects of non-limiting examples of a platform in the form of an aircraft and an engine in accordance with an embodiment of the present invention.

FIG. 3 schematically illustrates some aspects of a non-limiting example of a wiring harness in accordance with an embodiment of the present invention.

FIG. 4 schematically illustrates some aspects of a non-limiting example of a junction box in accordance with an embodiment of the present invention.

DETAILED DESCRIPTION

Figure 1:
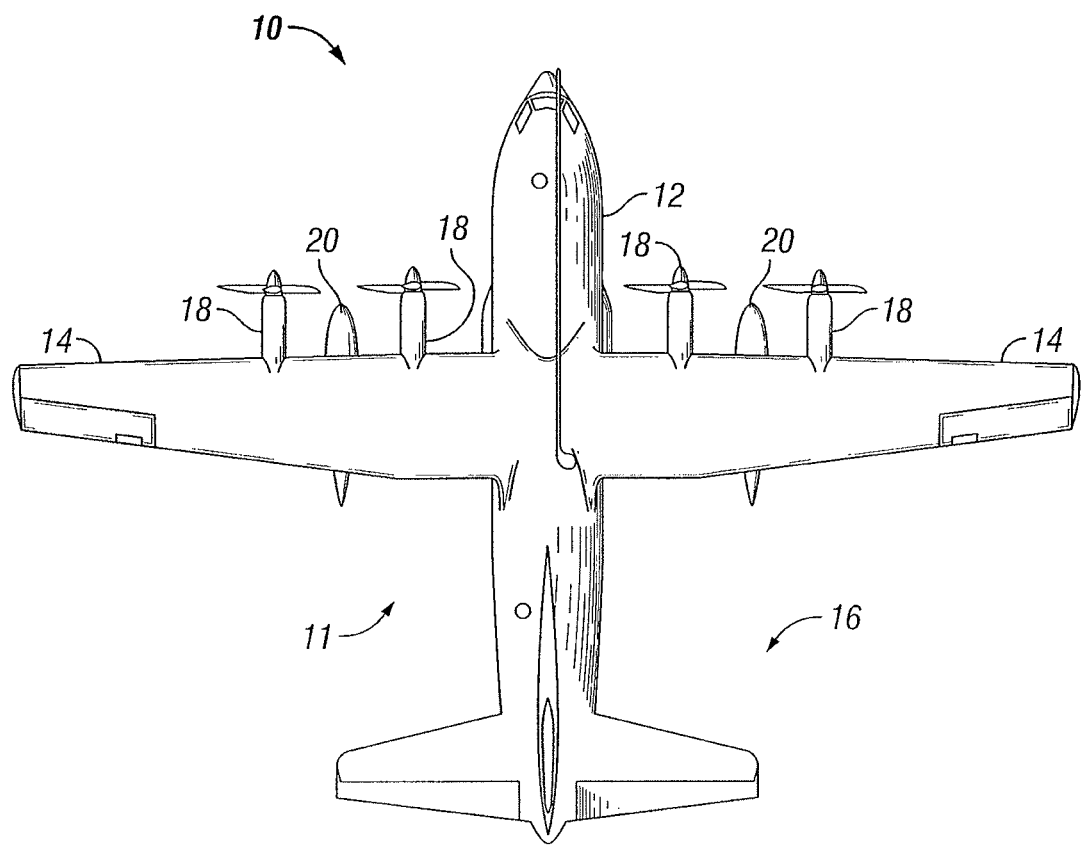
FIG. 1 illustrates some aspects of a non-limiting example of a platform in the form of an aircraft in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of a platform 10 in accordance with an embodiment of the present invention. In one form, platform 10 is an aircraft. In other embodiments, platform 10 may be, for example, a ground vehicle, such as a battle tank, a mobile weapon system, an armored personnel carrier, a personal, troop or supply transport vehicle or the like; a water-borne vessel, such as a skiff, a boat, a ship, a landing craft or the like; or a stationary platform, such as a generating or pumping station or system, or any platform having a system controlled by control system and/or a system that interfaces with one or more control systems, sensors, and/or other systems or devices. Platform 10 includes one or more structures 11. In one form, structure 11 is an airframe having a fuselage 12, wings 14 and an empennage 16. In other embodiments, other structures 11 may be employed in place of airframe structures. For example, structures 11 may be or include a ground vehicle frame, body and/or chassis; one or more structures of a water-borne vessel, e.g., a bridge, propulsion system structures and/or related control structures, generator system structures, flight deck structures, navigation and/or communication system structures; stationary system structures and the like. Platform 10 also includes one or more controlled systems 18 that are electrically and/or electronically operated and/or controlled, and includes external pods 20. In one form, a controlled system 18 is an engine, referred to herein as engine 18 (e.g., wherein four engines 18 in the form of propulsion engines are illustrated in the non-limiting example of FIG. 1). In other embodiments, controlled system 18 may take other forms, e.g., a transmission, a weapon system, or any other system that is electrically and/or electronically operated and/or controlled.

In one form, wings 14 and empennage 16 are coupled to fuselage 12; and engines 18 and external pods 20 are coupled to wings 14. In other embodiments, other coupling arrangements of fuselage 12, wings 14, empennage 16, one or more engines 18 and/or one or more external pods 20 may be employed. In one form, as an aircraft, platform 10 is a multi-engine military turboprop aircraft. In other embodiments, platform 10 may be any fixed-wing aircraft, including turbofan aircraft, turbojet aircraft and turboprop aircraft, having any number of engines, e.g., as propulsion engines and/or APU (auxiliary power unit) engines. In still other embodiments, platform 10 may be a rotary-wing aircraft or a combination rotary-wing/fixed-wing aircraft.

In one form, engines 18 are gas turbine engines. In other embodiments engines 18 may be one or more of turboshaft, turbofan, turbojet or turboprop engines and/or may be combined cycle engines or any other type of gas turbine engines and/or other types of engines, such as diesel or spark-ignition internal combustion engines, ramjet engines, scramjet engines and/or any other types of engines. Although described with respect to engines, the present invention is equally applicable to other components and systems.

In various embodiments, platform 10 may have a single engine 18 or a plurality of engines 18. In addition to engines 18 in the form of propulsion engines, platform 10 may include one or more engines 18 in the form of APU's. In addition, in various embodiments, platform 10 may employ any number of wings 14. Empennage 16 may employ a single flight control surface or multiple flight control surfaces. Although the depiction of FIG. 1 illustrates two external pods 20, in other embodiments, any number of external pods 20 may be employed, e.g., one or more external pods 20, or no external pods may be employed.

Referring to FIG. 2, some aspects of a non-limiting example of platform 10 and an engine 18 are schematically illustrated in accordance with an embodiment of the present invention. Platform 10 includes an electrical system 22. In one form, electrical system 22 is an aircraft electrical system, which may include, for example and without limitation, flight controls, navigational systems, sensors, and which in various embodiments is generally disposed in or about one or more portions of structure 11. In other embodiments, electrical system 22 may be any platform 10 electrical system, e.g., associated with one or more structures 11 or associated with platform 10 generally. Although illustrated as a unitary element, it will be understood that a plurality of electrical systems 22 may be distributed across many locations. In addition, it will be understood that FIG. 2 and the description herein may be representative of an APU or other engine mounted on and/or in platform 10 in addition to or in place of a propulsion engine.

Engine 18 includes an electronic control system 24. In one form, electronic control system 24 is an engine control system. In other embodiments, electronic control system 24 may be a control system configured to control one or more other devices and/or systems, e.g., one or more other types of controlled systems 18 in addition to or in place of one or more engines. In one form, electronic control system 24 includes at least one controller 26 for controlling one or more controlled systems 18. In one form, controller 26 is configured to control the operation of engine 18 or a plurality of engines 18, and may be, for example, an engine controller, such as a full authority digital engine control (FADEC). Electronic control system 24 may also include one or more other engine control components, for example and without limitation, a plurality of sensors 28, e.g., of various types typically employed in gas turbine and/or other engines; and one or more actuators 30, e.g., of various types typically employed in gas turbine and/or other engines; and one or more of other types engine control components. In various embodiments, the engine control components may provide signals to and/or receive signals from controller 26 and/or electrical system 22. One or more components of electronic control system 24 are in electrical communication with electrical system 22 via a controlled system wiring harness 32 (referred to herein as an engine wiring harness 32) coupled to and in electrical communication with a platform wiring harness 34, e.g., an aircraft wiring harness or another platform 10 related wiring harness, e.g., associated with structure 11.

Engine wiring harness 32 includes a wiring harness connector 36. Platform wiring harness 34 includes a wiring harness connector 38. Engine wiring harness 32 is electrically coupled to platform wiring harness 34 via wiring harness connectors 36 and 38. In one form, wiring harness connectors 36 and 38 are electrically coupled via a junction box 40, e.g., wherein each of wiring harness connectors 36 and 38 are mechanically and electrically coupled to junction box 40. In one form, junction box 40 is electrically shielded. In other embodiments, junction box 40 may not be electrically shielded. In still other embodiments, wiring harness connectors 36 and 38 are directly mechanically and electrically coupled to each other, i.e., without the use of an intervening junction box.

Each of engine wiring harness 32 and platform wiring harness 34 include at least one, but generally, a plurality of wires for transmitting electrical signals between engine wiring harness 32 and platform wiring harness 34. In particular, engine wiring harness 32 is configured to transmit electrical signals between electronic control system 24 components and platform wiring harness 34, which is configured to transmit the electrical signals between engine wiring harness 32 and electrical system 22. The electrical signals may be power signals and/or control level signals, and may be digital and/or analog. Power signals include, for example and without limitation, the provision of electrical power to/from one or more electrical/electronic components, e.g., including without limitation, controller 26, any electrically powered actuators, other motor driven or electrically actuated devices, and any other electrically powered device. Control level signals include, for example and without limitation, sensor 28 input and/or output signals, and command and control signals to one or more controllers, such as controller 26 and/or other controllers and/or actuators such as actuator 30. In some embodiments, engine wiring harness 32 and platform wiring harness 34 may include optical links for transmitting optical signals.

Referring to FIG. 3, some aspects of non-limiting examples of engine wiring harness 32 and wiring harness connector 36 are schematically illustrated in accordance with an embodiment of the present invention. Although a particular geometric configuration is illustrated in FIG. 3, it will be understood that FIG. 3 is schematic in nature, and that the actual configuration of engine wiring harness 32 and wiring harness connector 36 may vary with the needs of the application. Engine wiring harness 32 is depicted as including three (3) wires 42, 44 and 46 for electrical connection to three (3) corresponding wires in platform wiring harness 34. In various embodiments, any number of wires may be included in engine wiring harness 32 and platform wiring harness 34. In one form, wiring harness connector 36 includes a threaded female connector head 48. In other embodiments, other connector head types may be employed, male or female. In one form, connector head 48 is configured to engage a corresponding connector head on junction box 40 to couple engine wiring harness 32 with junction box 40. In other embodiments, connector head 48 may be configured to couple engine wiring harness 32 directly to platform wiring harness 34. Wiring harness connector 36, wiring harness connector 38 and junction box 40 are interfaces configured for electrically coupling or connecting engine wiring harness 32 to platform wiring harness 34.

Wires 42, 44 and 46 terminate at pins 50, 52 and 54 configured for electrical communication with corresponding receptacles in junction box 40, or alternatively, in platform wiring harness 34. In other embodiments, wires 42, 44 and 46 may terminate at receptacles configured for electrical communication with corresponding pins in junction box 40, or alternatively, in platform wiring harness 34. In one form, engine wiring harness 32 and platform wiring harness 34 are shielded. In one form, the shielding is provided in the form of a metallic screen surrounding the wires in the wiring harnesses and grounded at each end of the wiring harness, e.g., at the connectors, for example, metallic screen 56 depicted in engine wiring harness 32. In other embodiments, other forms of shielding may be employed. In other embodiments, one or both of engine wiring harness 32 and platform wiring harness 34 may not be shielded.

Many engines, such as engine 18, typically employ shielded harnesses, such as engine wiring harness 32, to protect against electromagnetic interference (EMI), e.g., including lightning strike and electromagnetic pulse (EMP). However, in some cases, the platform wiring harness does not have the same level of protection against EMI as the engine wiring harness, which may render engine electrical/electronic components susceptible to EMI damage. Also, engines of the same or similar model are often used in more than one platform or aircraft installation; the level of protection against EMI in the different platform models and configurations, e.g., aircraft models and configurations may vary. In order to prevent deleterious effects on the engine electrical/electronic components resulting from EMI, embodiments of the present invention employ an EMI protection component configured to protect one or more engine electrical/electronic components. Although such protection may be employed in the component itself, the variation in the required level of protection against EMI (e.g., inclusive of lightning strike) as between the different platform types or models, e.g., aircraft models, would necessitate the use of electrical/electronic components having protection tailored to each platform installation, e.g., aircraft installation, which may increase costs associated with the components, as well as costs associated with qualification testing of the component and/or the engine.

In one form, engine wiring harness 32 includes EMI protection components 58 and 60. In other embodiments, engine wiring harness 32 may include a greater or lesser number of EMI protection components. EMI protection components 58 and 60 are configured for transient suppression of electromagnetic spikes, e.g., voltage spikes. In one form, EMI protection components 58 and 60 are disposed in wiring harness connector 36. In other embodiments, one or both of EMI protection components 58 and 60 may be disposed in elsewhere in engine wiring harness 32. In still other embodiments, one or both of EMI protection components 58 and 60 may be disposed in other locations, e.g., in platform wiring harness 34, including in wiring harness connector 38, and/or junction box 40 in addition to or in place of engine wiring harness 32.

In one form, EMI protection components 58 and 60 are configured to provide EMI protection for controller 26. In other embodiments, EMI protection components may be employed to provide EMI protection for other components, e.g., including sensors 28 and actuator 30, in addition to or in place of controller 26. In one form, EMI protection components 58 and 60 are passive protection devices. In other embodiments, one or both of EMI protection components 58 and 60 may be active protection devices. In one form, EMI protection components 58 and 60 are EMI filters. In other embodiments, EMI protection components 58 and 60 may take other forms. Examples of suitable filter types include, without limitation, one or more of xenon filters, zener diodes, inductor capacitor networks (LC filters) and/or transorbs. In other embodiments, other filter types and/or other types of EMI protection devices may be employed. In one form, EMI protection components 58 and 60 are tailored for the particular electrical/electronic component/circuit sought to be protected, and hence, may not provide the same level of EMI protection. For example, power supply and return lines may require different levels of protection than sensor lines. In other embodiments, EMI protection components 58 and 60 may provide the same degree of EMI protection.

In one form, EMI protection components 58 and 60 are removable and replaceable, e.g., so that EMI protection may be reconfigured with different EMI protection characteristics in accordance with the needs of the particular application without damaging or destroying either of EMI protection components 58 and 60 (i.e., nondestructive removal and replacement). For example, in some situations, it may be desirable to use the same engine on another platform, e.g., aircraft, which may require reconfiguring the EMI protection. In other embodiments, one or both of EMI protection components 58 and 60 may not be configured for nondestructive removal and replacement.

Referring to FIG. 4, some aspects of a non-limiting example of junction box 40 in accordance with an alternate embodiment of the present invention is schematically depicted. Although a particular geometric configuration is illustrated in FIG. 4, it will be understood that FIG. 4 is schematic in nature, and that the actual configuration of junction box 40 may vary with the needs of the application. In the embodiment of FIG. 4, junction box 40 includes male connector heads 62 and 64 for mechanically and electrically coupling wiring harness connectors 36 and 38, respectively, to junction box 40. In other embodiments, one or both of connector heads 62 and 64 may be female connector heads. Junction box 40 also includes receptacles 66, 68 and 70 in electrical communication with respective receptacles 72, 74 and 76 for electrical connection to mating pins in wiring harness connectors 36 and 38. In other embodiments, pins may be employed in place of receptacles on mating components and vice versa. In the embodiment of FIG. 4, EMI protection components 58 and 60 are disposed within junction box 40. As with the embodiment of FIG. 3, in one form, EMI protection components 58 and 60 are removable and replaceable, e.g., so that EMI protection may be reconfigured with different EMI protection characteristics in accordance with the needs of the particular application without damaging or destroying either of EMI protection components 58 and 60 (nondestructive removal and replacement). In other embodiments, one or both of EMI protection components 58 and 60 may not be configured for nondestructive removal and replacement. As set forth above, in other embodiments, the EMI protection components may be disposed in platform wiring harness 34, e.g., in wiring harness connector 38, in addition to or in place of engine wiring harness 32 and/or junction box 40.

Embodiments of the present invention include a platform, comprising: a structure; a platform electrical system; a platform wiring harness; an engine coupled to the structure, wherein the engine includes an engine control system; and a wiring harness system coupling the engine control system to the platform electrical system, wherein the wiring harness system includes an engine wiring harness; coupled to the platform wiring harness; an interface configured to electrically connect the engine wiring harness to the platform wiring harness; and an electromagnetic interference (EMI)

protection component configured to provide EMI protection for the engine control system.

In a refinement, the interface includes a wiring harness connector installed as part of the platform wiring harness or the engine wiring harness, and wherein the EMI protection component is incorporated in the wiring harness connector.

In another refinement, the wiring harness connector is an engine wiring harness connector.

In yet another refinement, the EMI protection component is a passive protection device.

In still another refinement, the EMI protection component is configured to provide lightning protection for the engine control system.

In yet still another refinement, the interface includes a junction box configured to connect the engine wiring harness to the platform wiring harness, and wherein the EMI protection component is disposed within the junction box.

In a further refinement, the junction box is shielded.

In a yet further refinement, the EMI protection component is configured for nondestructive removal replacement.

Embodiments of the present invention include a wiring harness system, comprising: a first wiring harness coupled to an electrical system component and configured to transmit an electrical signal to and/or from the electrical system component; an interface configured for coupling the first wiring harness to a second wiring harness; and an electromagnetic interference (EMI) protection component disposed in the wiring harness system and configured to provide EMI protection for the electrical system component.

In a refinement, the interface includes a wiring harness connector, and wherein the EMI protection component is incorporated in the wiring harness connector.

In another refinement, the EMI protection component is configured to provide lightning protection for the electrical system component.

In yet another refinement, the interface includes a junction box configured to connect the first wiring harness to the second wiring harness, and wherein the EMI protection component is disposed within the junction box.

In still another refinement, the junction box is shielded.

In yet still another refinement, the EMI protection component is configured for nondestructive removal and replacement.

In a further refinement, the EMI protection component is a passive protection device.

In a yet further refinement, the EMI protection component is an EMI filter.

In a still further refinement, the interface is configured for removable replacement of the EMI protection component with another EMI protection component having a different EMI protection characteristic.

Embodiments of the present invention include a platform system, comprising: a controlled system; an electronic control system configured to control operation of the controlled system; and a wiring harness system configured to couple the electronic control system to a platform wiring harness, wherein the wiring harness system includes a controlled system wiring harness coupled to the electronic control system and configured to transmit an electrical signal to and/or from the electronic control system; an interface configured for coupling the controlled system wiring harness to the platform wiring harness; and means for providing EMI protection for the electronic control system disposed in the wiring harness system.

In a refinement, the means for providing EMI protection is configured to provide lightning protection for the electronic control system.

In another refinement, the means for providing EMI protection is disposed in the interface.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A platform, comprising:
   a structure;
   a platform electrical system;
   an engine coupled to the structure, wherein the engine includes an engine control system; and
   a wiring harness system coupled between and connecting the engine control system to the platform electrical system, wherein the wiring harness system includes an engine wiring harness;
   the engine wiring harness coupled to a platform wiring harness; an interface configured to electrically connect the engine wiring harness to the platform wiring harness; and at least one electromagnetic interference (EMI) protection component coupled to, and surrounding a pin within a connector head of the engine wiring harness and configured to provide EMI protection for the engine control system,
   wherein the connector head comprises a plurality of pins and at least one of the plurality of pins is not electrically shielded, and
   wherein each of the at least one EMI protection components surrounds a respective individual pin within the connector head.

2. The platform of claim 1, wherein the interface includes a wiring harness connector installed as part of the platform wiring harness or the engine wiring harness, and wherein the EMI protection component is incorporated in the wiring harness connector.

3. The platform of claim 2, wherein the wiring harness connector is an engine wiring harness connector.

4. The platform of claim 1, wherein the at least one EMI protection component is a passive protection device.

5. The platform of claim 1, wherein the at least one EMI protection component is configured to provide lightning protection for the engine control system.

6. The platform of claim 1, wherein the interface includes a junction box configured to connect the engine wiring harness to the platform wiring harness, and wherein the at least one EMI protection component is disposed within the junction box.

7. The platform of claim 1, wherein the at least one EMI protection component is configured for nondestructive removal and replacement.

8. The platform of claim 1, wherein the at least one EMI protection component is an EMI filter.

9. A platform system, comprising:

a controlled system;

an electronic control system configured to control operation of the controlled system; and a wiring harness system configured to couple the electronic control system to a platform wiring harness, wherein the wiring harness system includes a controlled system wiring harness coupled to the controlled system and configured to transmit an electrical signal to and/or from the controlled system; an interface configured for coupling the controlled system wiring harness to the platform wiring harness; and means for providing EMI protection for the electronic control system disposed in the wiring harness system, wherein the means for providing EMI protection comprises a plurality of EMI protection components coupled to, and surrounding pins within a connector head of the wiring harness system and located in spaced apart relation to each other that are each configured for individual nondestructive removal and replacement from each of the pins, wherein only some of the pins within the connector head of the wiring harness are electrically shielded, wherein the each of the plurality of EMI protection components surrounds a respective individual Din within the connector head.

10. The platform system of claim 9, wherein the means for providing EMI protection is configured to provide lightning protection for the electronic control system.

* * * * *

UNITED STATES PATENT AND TRADEMARK OFFICE
CERTIFICATE OF CORRECTION

| | | |
|---|---|---|
| PATENT NO. | : 9,640,959 B2 | Page 1 of 1 |
| APPLICATION NO. | : 14/319422 | |
| DATED | : May 2, 2017 | |
| INVENTOR(S) | : Andrew Charles Pickard et al. | |

It is certified that error appears in the above-identified patent and that said Letters Patent is hereby corrected as shown below:

On the Title Page

In (72) Inventors paragraph, Inventor: Philip Martin Green should be Philip Martin Geen Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*